United States Patent Office 2,925,263
Patented Feb. 16, 1960

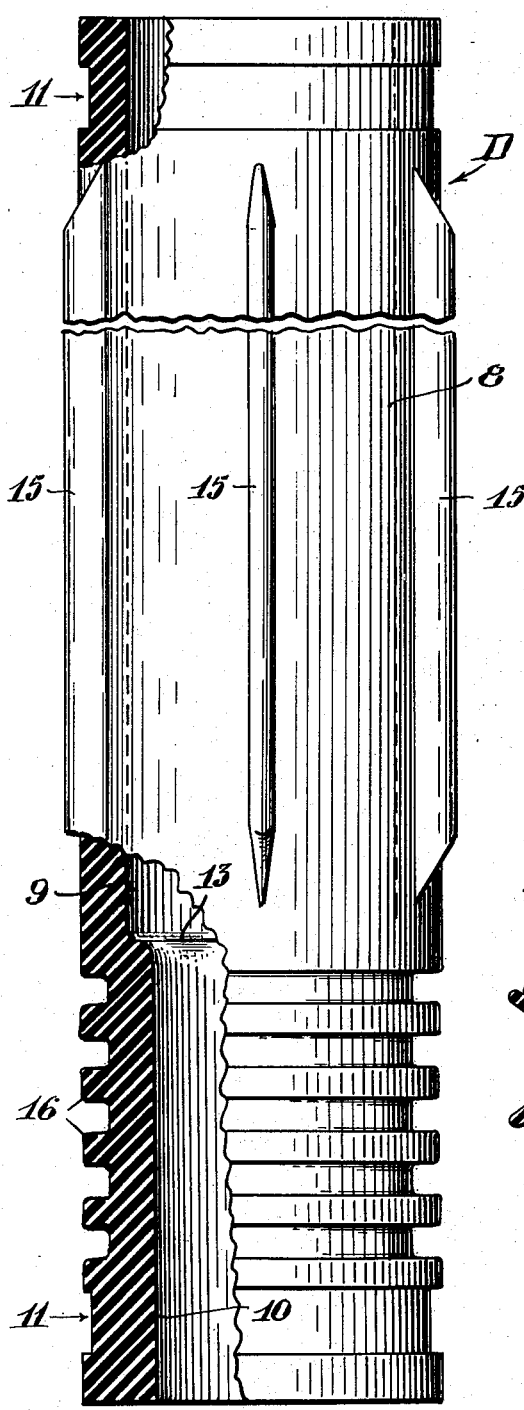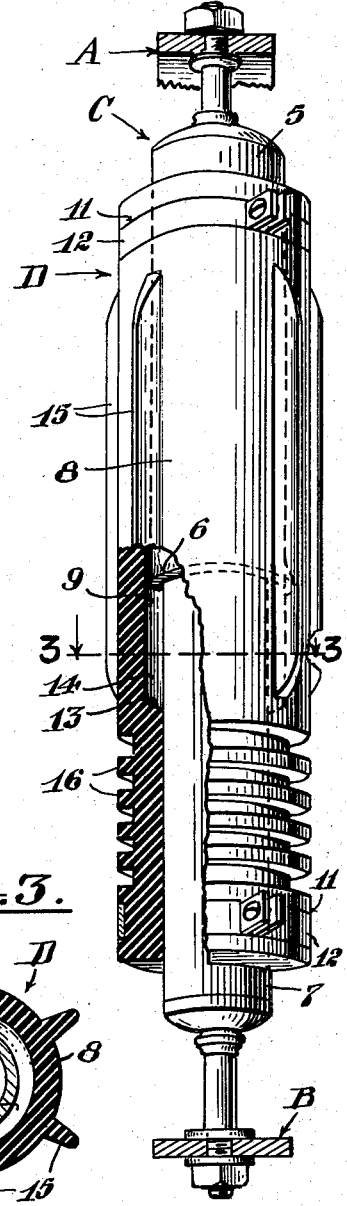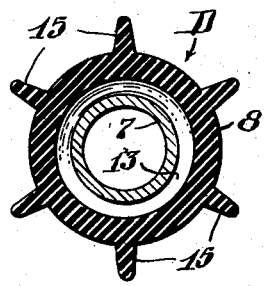

2,925,263
SUPPLEMENTAL SHOCK ABSORBER
Allen W. Blythe, Whittier, Calif.
Application March 31, 1958, Serial No. 725,267
5 Claims. (Cl. 267—8)

This invention relates to an attachment for conventional shock absorbers of the type employed on automobiles for the purpose of supplementing the operation of such shock absorbers to render their action more efficient and to compensate for wear thereof, the invention particularly pertaining to improvements in the type of shock absorber attachment set forth in Letters Patent No. 2,833,535, issued to me under date of May 6, 1958.

In addition to the objects and purposes set forth in the above named patent, an object of this invention is to provide an attachment embodying an open ended resilient tubular sleeve having a continuous elastic cylindrical side wall adapted to be affixed in encompassing engagement with a pair of relatively reciprocal telescoped cylindrical elements of a conventional type of shock absorber apart from the mounting thereof.

Another object is to provide a construction in the tubular sleeve which while permitting relative longitudinal movement of the shock absorber will offer yieldable resistance to such movement such as to augment the function of the shock absorber.

Another object is to provide a construction in the tubular sleeve whereby the degree of its resiliency is varied at different portions of the length thereof so that little resistance will be offered to initial elongation or compression of the sleeve followed by greatly increased resistance to further elongation of compression.

A further object is to provide a resilient sleeve for encompassing the relatively movable telescoped elements of a shock absorber in which air is entrapped within the sleeve so as to cooperate with the resilient property of the latter in effecting a cushioning action, in which means are provided for reinforcing the wall of the sleeve against excessive distortion under internal and external pressures imposed therein particularly as are developed by displacement of the air body entrapped within the sleeve.

With the foregoing objects in view together with such other objects and advantages as may subsequently appear, the invention resides in the parts and in the combination, construction and arrangement of parts hereinafter described and claimed and as illustrated by way of example in the accompanying drawing in which:

Fig. 1 is a view of the attachment as seen in elevation partly in section showing it detached;

Fig. 2 is a perspective view of the attachment showing it as applied, with parts broken away; and Fig. 3 is a detail in cross section taken on the line 3—3 of Fig. 2.

Referring to the drawings more specifically A and B indicate spaced vertically opposed upper and lower brackets carried respectively by the frame and axle of a motor vehicle and C designates generally a conventional shock absorber interposed between and connected at its ends in a substantially upright position to the brackets A—B in the usual manner. The shock absorber here shown embodies an elongated tubular cylinder 5 one end of which is closed and the other end of which is open. The cylinder 5 is of uniform external diameter throughout except that the margin 6 of its open end is outwardly flared. Slidably extending into the open end of the cylinder 5 is one end portion of an elongated cylindrical piston 7, the other end portion of which protrudes from the cylinder 5. The piston 7 is of uniform external diameter throughout less than that of the cylinder 5 so that its outer surface is offset inwardly relative to the outer face of the cylinder 5. The outer ends of the cylinder 5 and piston 7 are affixed to the brackets A—B whereby on movement of the brackets relative to each other the cylinder and piston will be reciprocated relative to each other to effect a shock absorbing action in the usual manner.

In carrying out the invention, an elongated resilient open ended tubular sleeve D is provided which sleeve is designed to be mounted on the shock absorber in encompassing relation thereto. The sleeve D embodies an elastic cylindrical side wall 8 of general uniform external diameter and having internal end portions of different diameters; the end portion of the sleeve of the largest internal diameter having an inner cylindrical wall surface 9 conformable to the exterior of the cylinder 5 and the end portion of the sleeve of smallest internal diameter having an inner cylindrical wall surface 10 conformable to the exterior of the piston 7.

The sleeve D is formed adjacent its ends with external circumferential channels 11—11 for the reception of metallic clamping bands 12—12 by means of which the wall 8 is clamped into gripping engagement with the cylinder 5 and piston 7 adjacent their outer ends, the sleeve D having a length such that its ends will be disposed a short distance in inwardly spaced relation to the outer ends of the cylinder 5 and piston 7 when in their extended position relative to each other.

The cylindrical inner wall surfaces 9 and 10 of the sleeve D are co-axial and terminate interiorly of the sleeve in an annular shoulder 13 located to encompass the piston 7 in outwardly spaced relation to the flared end 6 of the cylinder 5 so as to form a chamber 14 affording sufficient clearance between the shoulder 13 and cylinder end 6 such as to permit advance of the cylinder 5 and piston 7 relative to each other without impact of the end of the cylinder on the shoulder 13 except possibly at or approaching the end of the extreme inward relative movement of the piston and cylinder.

Formed on the exterior of the sleeve D is a series of longitudinally extending reinforcing ribs 15 leading from adjacent the point opposite the shoulder 13 and opposite the space 14 and terminating adjacent the channel 11 at the end of the sleeve encompassing the shoulder 5. The ribs 15 serve to stiffen the wall portion 8 of the sleeve overlying the cylinder 5 and the space 14 between which portion and the portions of the shock absorber encompassed thereby is entrapped a body of air. The wall portion 8 of the sleeve D encompassing the piston 7 is reinforced by a plurality of circumferentially extending ribs 16 which while serving to reinforce the lower end portion of the sleeve against excessive lateral expansion offer little resistance to compression or elongation of this portion of the wall of the sleeve.

In the application of the attachment, the sleeve D is applied to the shock absorber C by inserting the piston 7, detached from the bracket B, into the internally enlarged end portion of the sleeve, and advancing the piston through the reduced internal end portion, to bring the ends of the sleeve in desired inwardly spaced relation from the ends of the cylinder 5 and piston 7 as indicated in Fig. 2, with the piston 7 in an extended position relative to the cylinder 5. The clamping rings 12 are applied and tightened so as to bring the end portions of the sleeve D into gripping and sealed engagement with the cylinder and piston. In this position the shoulder 13 will be spaced outwardly relative to the flared end 6 of the cylinder 5 as shown. The portion of the sleeve D encompassing the piston 7 snugly conforms to the latter between the shoulder 13 and the lower end of the sleeve while the other end portion of the sleeve between the upper clamping ring 12 and the shoulder 13 loosely encompass the cylinder 5, which, with the clearance afforded by the space 14, provides a dead air space between the sleeve and the shock absorber within which a body of air is confined.

In the operation of the invention compressive movement of the shock absorber, wherein the piston 7 and cylinder 5 advance relative to each other, as when the brackets A and B are moved toward each other, the elastic wall 8, particularly the portion thereof encompassing the internally enlarged part 9 will be extended laterally under its inherent resistance, by displacement of the air body confined in the sleeve D coupled with the longitudinal compressive pressure imposed on the wall 8 by advance of the cylinder 5 and piston 7 relative to each other. During this action the air body confined in the sleeve D will be subjected to pressure which with the resistance offered by the resilient wall 8 will act to cushion initial compressive movement of the shock absorber and thereby relieve the latter of sudden impact, and during this operation the longitudinal stiffening ribs 15 will act to limit compression of the portion of the wall 8 carrying the ribs 15 and whereby the major portion of the longitudinal compression of the sleeve will occur in the circumferentially ribbed lower portion thereof encompassing the piston 7. In event of extreme inward movement of the cylinder 5 and piston 7 relative to each other the flared end 6 of the cylinder 5 and the internal shoulder 15 of the sleeve D will impact each other whereby the circumferentially ribbed portion of the sleeve then under some compression will act as a cushioning abutment at the end of the compressive movement of the shock absorber.

On rebound of the shock absorber, occurring when the brackets A—B of the vehicle carrying same are caused to spread apart beyond their normal position, which effects relative outward movement of the cylinder 5 and piston 7 beyond normal, such movement of the cylinder and piston elongates the sleeve D against its inherent resistance to stretch the wall 8 and at the same time tending to produce negative pressure interiorly of the sleeve thus setting up forces yieldably resisting extension of the shock absorber cylinder and piston relative to each other with gradually increasing resistance. Cushioning of the extension movement of the shock absorber beyond its normal position is thus markedly augmented. Due to the increasing resistance afforded by the attachment the shock absorber will normally reach the termination of its compressive and expansive strokes without impact or sudden jar which inures to smooth and comfortable riding in the vehicle having shock absorbers of the character set forth equipped with the attachment.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. An attachment for shock absorbers comprising an open ended tubular sleeve embodying a continuous resilient cylindrical side wall having end portions of differential internal diameters with an internal shoulder at the intersection of said end portions, a series of longitudinal reinforcing ribs on the exterior of the end portion having the larger internal diameter, and a series of circumferentially extending ribs on the exterior of the end portion having the lesser internal diameter.

2. The combination with a shock absorber for positioning between relatively moveable members, wherein the shock absorber embodies a cylinder attached at one end to one of said members and having an open free end, and including a piston in said cylinder projecting from the free end of said cylinder and connected to the other of said members; of a resilient tubular sleeve open at its ends having an elastic cylindrical side wall, the opposite end portions of which sleeve have different internal diameters, said sleeve encompassing said shock absorber with the end portion thereof having the larger internal diameter encompassing said cylinder and projecting from the free end thereof and with the end portion of said sleeve of the lesser internal diameter encompassing the projected portion of said piston; and means clamping the end portions of said sleeve in sealed gripping engagement with said cylinder and piston; there being a dead air chamber interiorly of said sleeve, said sleeve having a series of longitudinally extending ribs on the exterior of the end portion thereof of larger internal diameter.

3. The combination with a shock absorber for positioning between relatively moveable members, wherein the shock absorber embodies a cylinder attached at one end to one of said members and having an open free end, and including a piston in said cylinder projecting from the free end of said cylinder and connected to the other of said members; of a resilient tubular sleeve open at its ends having an elastic cylindrical side wall, the opposite end portions of which sleeve have different internal diameters, said sleeve encompassing said shock absorber with the end portion thereof having the larger internal diameter encompassing said cylinder and projecting from the free end thereof and with the end portion of said sleeve of the lesser internal diameter encompassing the projected portion of said piston; and means clamping the end portions of said sleeve in sealed gripping engagement with said cylinder and piston; there being a dead air chamber interiorly of said sleeve, said sleeve having a series of longitudinally extending ribs on the exterior of the end portion thereof of larger internal diameter, and having a series of circumferentially extending ribs on the exterior thereof between said longitudinal ribs and an end of said sleeve.

4. The combination with a shock absorber for positioning between relatively moveable members, wherein the shock absorber embodies a cylinder attached at one end to one of said member and having an open free end, and including a piston in said cylinder projecting from the free end of said cylinder and connected to the other of said members; of a resilient tubular sleeve open at its ends having an elastic cylindrical side wall, the opposite end portions of which sleeve have different internal diameters, said sleeve encompassing said shock absorber with the end portion thereof having the larger internal diameter encompassing said cylinder and projecting from the free end thereof and with the end portion of said sleeve of the lesser internal diameter encompassing the projected portion of said piston; and means clamping the end portions of said sleeve in sealed gripping engagement with said cylinder and piston; there being a dead air chamber interiorly of said sleeve, said sleeve having an internal annular shoulder at the juncture of its different internal diameters, said shoulder being normally spaced outwardly in relation to the free end of said cylinder and constituting an abutment therefor, and a series of longitudinally extending ribs on the exterior of said sleeve leading from adjacent said shoulder to adjacent the outer end portion of said sleeve encompassing said cylinder.

5. The combination with a shock absorber for positioning between relatively moveable members, wherein the shock absorber embodies a cylinder attached at one end to one of said members and having an open free end, and including a piston in said cylinder projecting from the free end of said cylinder and connected to the other of said members; of a resilient tubular sleeve open at its ends having an elastic cylindrical side wall, the opposite end portions of which sleeve have different internal diameters, said sleeve encompassing said shock absorber with the end portion thereof having the larger internal diameter encompassing said cylinder and projecting from the free end thereof and with the end portion of said sleeve of the lesser internal diameter encompassing the projected portion of said piston; and means clamping the end portions of said sleeve in sealed gripping engagement with said cylinder and piston; there being a dead air chamber interiorly of said sleeve, said sleeve having a series of longitudinally extending ribs on the exterior of the end portion thereof encompassing said cylinder, and having a plurality of circumferentially extending ribs on the end portion of said sleeve encompassing said piston.

References Cited in the file of this patent

UNITED STATES PATENTS

| | | |
|---|---|---|
| 1,470,493 | Show | Oct. 9, 1923 |
| 2,833,535 | Blythe | May 6, 1958 |

FOREIGN PATENTS

| | | |
|---|---|---|
| 698,322 | Great Britain | Oct. 14, 1953 |